US006402472B1

(12) United States Patent
Hogue et al.

(10) Patent No.: US 6,402,472 B1
(45) Date of Patent: Jun. 11, 2002

(54) SAIL-TYPE WINDMILL WHEEL

(76) Inventors: Allan Curtis Hogue; Jeanette Diane Hogue, both of 5805 Kevin, Texarkana, TX (US) 75503

( * ) Notice: Subject to any disclaimer, the term of this patent is extended or adjusted under 35 U.S.C. 154(b) by 72 days.

(21) Appl. No.: 09/707,801

(22) Filed: Nov. 8, 2000

Related U.S. Application Data

(60) Provisional application No. 60/185,927, filed on Feb. 29, 2000.

(51) Int. Cl.$^7$ ................................. F03D 1/06
(52) U.S. Cl. .................. 416/132 A; 416/2; 416/41; 416/117; 416/132 B; 416/134 R; 416/135; 416/136; 416/240
(58) Field of Search ................. 416/2, 41, 44, 416/48, 117, 132 R, 132 A, 132 B, 134 R, 135, 136, 240

(56) References Cited

U.S. PATENT DOCUMENTS

| | | | | |
|---|---|---|---|---|
| 1,407,373 A | * | 2/1922 | Brymer | .................. 416/132 B |
| 1,417,000 A | | 5/1922 | Vogt et al. | |
| 2,015,777 A | | 10/1935 | Belding | |
| 2,050,142 A | * | 8/1936 | White | ..................... 416/132 B |
| 2,464,234 A | * | 3/1949 | Jacobs | ........................ 416/136 |
| 2,633,921 A | | 4/1953 | Monney | |
| 4,066,911 A | | 1/1978 | Sarchet | |
| 4,248,568 A | * | 2/1981 | Lechner | ........................ 416/119 |
| 5,083,902 A | * | 1/1992 | Rhodes | ......................... 416/117 |

OTHER PUBLICATIONS

Calvert, N.G. "The Characteristics of a Sailmill." *Journal of Industrial Aerodynamics* 3 (1978): 79–84 Elsevier Scientific Publishing Company, Amsterdam.
Sweeney, T.E. *The Water Pumping Windmills of Crete.* Princeton University, 1975.

* cited by examiner

*Primary Examiner*—Christopher Verdier

(57) ABSTRACT

A sail-type windmill wheel is provided in which the area of the wheel facing into the wind is adjusted by an automatic variation of the blade angle of the sails. The wind wheel comprises a hub (22) with a plurality of radially extending spars (18), substantially triangular sails (10) secured along one edge to said arms, the clew of said sails secured through a sheeting cable (24) to drawbar extension springs (28), and the drawbar extension springs secured to the tip of the next adjacent arm. During high wind speeds the automatic blade angle adjustment reduces the frontal area of the wind wheel with a corresponding reduction in the force of the wind upon the wheel. During normal working wind speeds the present invention maintains the sails within an optimum blade angle range for extracting energy from the wind.

6 Claims, 4 Drawing Sheets

SAIL-TYPE WINDMILL WHEEL

CROSS REFERENCE TO RELATED APPLICATIONS

This invention is entitled to the benefit of Provisional Patent Application Ser. No. 60/185,927, filed Feb. 29, 2000.

STATEMENT REGARDING FEDERALLY SPONSORED RESEARCH OF DEVELOPMENT

Not Applicable

BACKGROUND OF THE INVENTION

This invention relates generally to windmills and particularly to an improved sail-type windmill wheel wherein the area of the wheel facing the wind is automatically adjusted.

It has long been established that sail fabric is an economic material for use in the construction of windmill blades. Windmills with sail blades have been in use for hundreds of years along the Mediterranean, and may still be found in use on the island of Crete. These windmills are constructed principally for the purpose of grinding grain or pumping water. These historical designs, however, require constant attention from their operators. Specifically, the frontal area that the sails present to the wind must be reduced in high winds to prevent damage to the sails or windmill structure. A reduction in area results in a reduction of the effective resistance of the windmill wheel to the wind with a corresponding reduction in force upon the wheel. This reduction in sail area is typically accomplished by manually removing the sails or wrapping them around their supporting arm (See Sweney, page 8).

The labor required to operate these historical sail windmills makes them unacceptable for widespread modern use. Inventors have attempted to alleviate this problem through various mechanisms that increase the blade angle of the sails with increasing wind velocity, thereby reducing the area of the sails facing the wind. Blade angle is defined by the angle which an imaginary rigid sail makes with the plane of rotation of the windmill wheel (FIG. 3). The greater the blade angle, the less area the sail presents to the wind. It is desirable, though, to maintain a small blade angle of approximately twelve degrees during operation of the windmill wheel in normal wind speeds so that the sails will work with maximum efficiency (See Calvert, page 81).

U.S. Pat. No. 2,015,777 to Belding (1934) discloses a simple but impractical mechanism for effecting a variable blade angle. Belding's wind wheel comprises a hub, radially extending arms connected to the hub, and triangular sails secured along one edge to the arms. Belding proposed the use of a simple tension spring interposed between the corner, or in nautical terminology, the clew, of a sail and the next adjacent arm on the windmill. The object of the tension spring is to allow the sail to move outwardly with an increase in wind velocity, thus increasing the blade angle of the sail. I constructed a working sail-type windmill utilizing Belding's proposed tension springs and discovered that the tension springs were destroyed in high winds, being stretched beyond their elastic limit and permanently deformed. I substituted stronger tension springs for the springs that were damaged in order to find a spring that would not be destroyed in storms. I determined that a tension spring strong enough to survive storms was too strong to allow the sails to assume a satisfactory blade angle (approximately 12 degrees) during normal wind speeds. This is due to the requirement that the tension springs apply a slight tension to the sails at all times; I discovered that the sails, when tethered loosely under the weight of the tension springs, tended to flap destructively with a change in wind direction.

The present invention provides for an improved means of automatically adjusting the frontal area of a sail windmill by adjustment of the blade angle of the sails. I contemplated that instead of a tension spring a compression spring might be used which is acted upon by drawbars. Drawbars are "U" shaped metal loops passing through the compression spring's center from each end and hooking around the opposite end of the spring; when tension load is applied to these drawbars they compress the spring, resulting in an extension of the assembly (FIG. 2). The advantage of this assembly is that the drawbars provide a stop which prevents the spring from excessive deflection and failure. The compression spring in this assembly is not subject to excessive loads; when the spring is fully compressed the travel of the drawbars simply stops. This assembly of a compression spring and drawbars will be referred to as a drawbar extension spring in the remainder of this document.

I constructed a working sail-type windmill with a 12 foot diameter wheel utilizing drawbar extension springs. I observed that the drawbar extension springs both maintained a proper sail blade angle (approximately 12 degrees) during normal wind speeds and provided for a sufficiently large blade angle during high wind speeds to prevent damage to the windmill.

I conducted further experiments which established that a sail-type windmill spinning about a horizontal axis worked with greatest efficiency when the leading edge of the sails are rolled over to form a sleeve wherein the sails are mounted on the spars. I also determined that sails made from high modulus, polyester fiber sailcloth obtained the greatest efficiency. Modulus is the measure of stretch or elasticity of a fabric; a high modulus fabric is a low stretch fabric, unlike the canvas material used on the Mediterranean windmills.

Other more complex mechanisms for the automatic adjustment of sail blade angle are illustrated by U.S. Pat. Nos. 4,066,911, 2,633,921, and 1,417,000. These devices are characterized by complex construction and a high cost to build and maintain. These inventions have not been commercially successful to the best of my knowledge, most likely due to basic inefficiency or a complicated, expensive mechanism.

BRIEF SUMMARY OF THE INVENTION

An improved sail-type windmill wheel is provided in which the area of the wheel facing into the wind is adjusted by an automatic variation in the blade angle of the sails. The wind wheel comprises a hub with a plurality of radially extending arms, substantially triangular sails secured along one edge to said arms, the clew of said sails secured through a sheeting cable to drawbar extension springs, and the drawbar extension springs secured to the tip of the next adjacent arm.

It is accordingly a principal object of the present invention to provide a sail-type windmill wheel in which the blade angle of the sails is automatically adjusted.

It is also an object of the present invention to provide a sail-type windmill wheel which is economical to build and operate.

It is another object of the present invention to provide a sail-type windmill wheel in which the blade angle of the sails increases with increasing wind velocity.

It is a further object of the present invention to provide a sail-type windmill wheel in which the blade angle of the sails is maintained at approximately 12 degrees or less during normal wind speeds.

It is also an object of the present invention to provide a sail-type windmill wheel in which the leading edge of the sails are rolled over to form a sleeve wherein the sails are mounted on a circular spar.

Yet another object of the present invention is to provide a sail-type windmill wheel in which the clew of each sail is secured by cordage that has a breaking strength less than that of the sails, sheeting cables, drawbar extension springs, or any other linkage securing the sails, so that such cordage shall break in hurricane winds thus allowing the sails to extend normal to the plane of rotation of the wind wheel.

One further object of the present invention is to provide sail-type windmill wheel in which the sails are constructed of high modulus, firm finish, polyester sailcloth.

These and other objects of this invention will be more clearly understood from the following detailed description when taken in conjunction with the drawings wherein.

Figure 1:
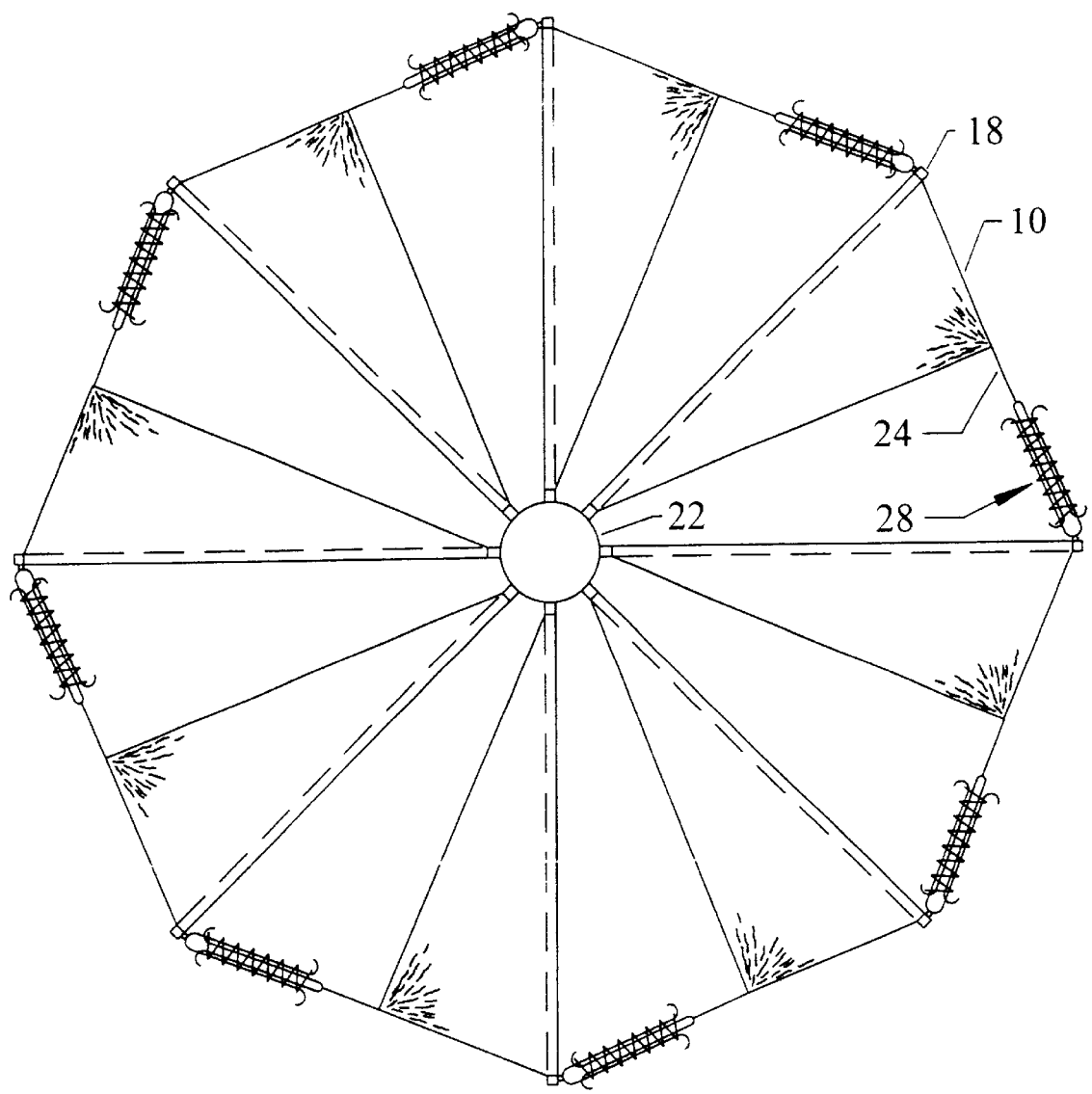
FIG. 1 is a front elevational view of the windmill wheel constructed in accordance with the present invention.
Figure 2:
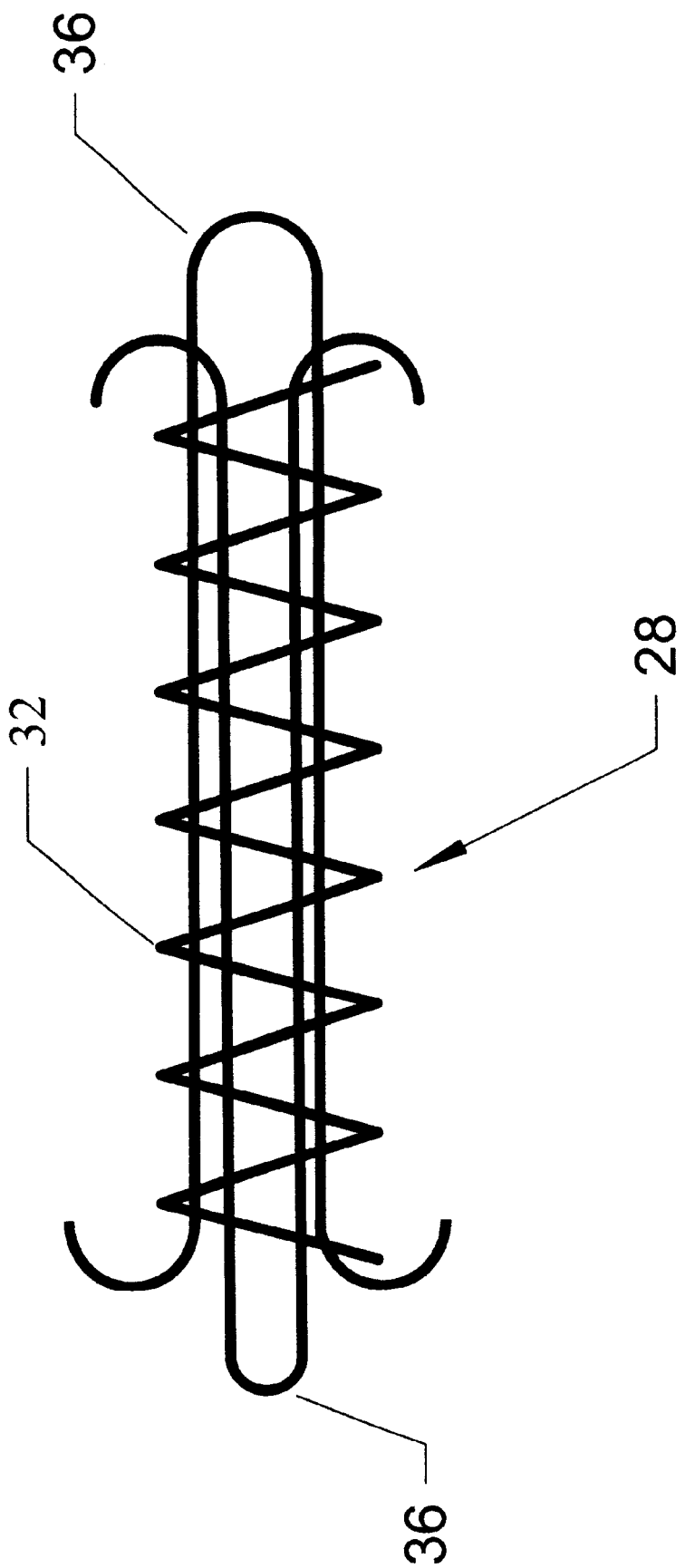
FIG. 2 is a diagram illustrating a drawbar extension spring.
Figure 3:
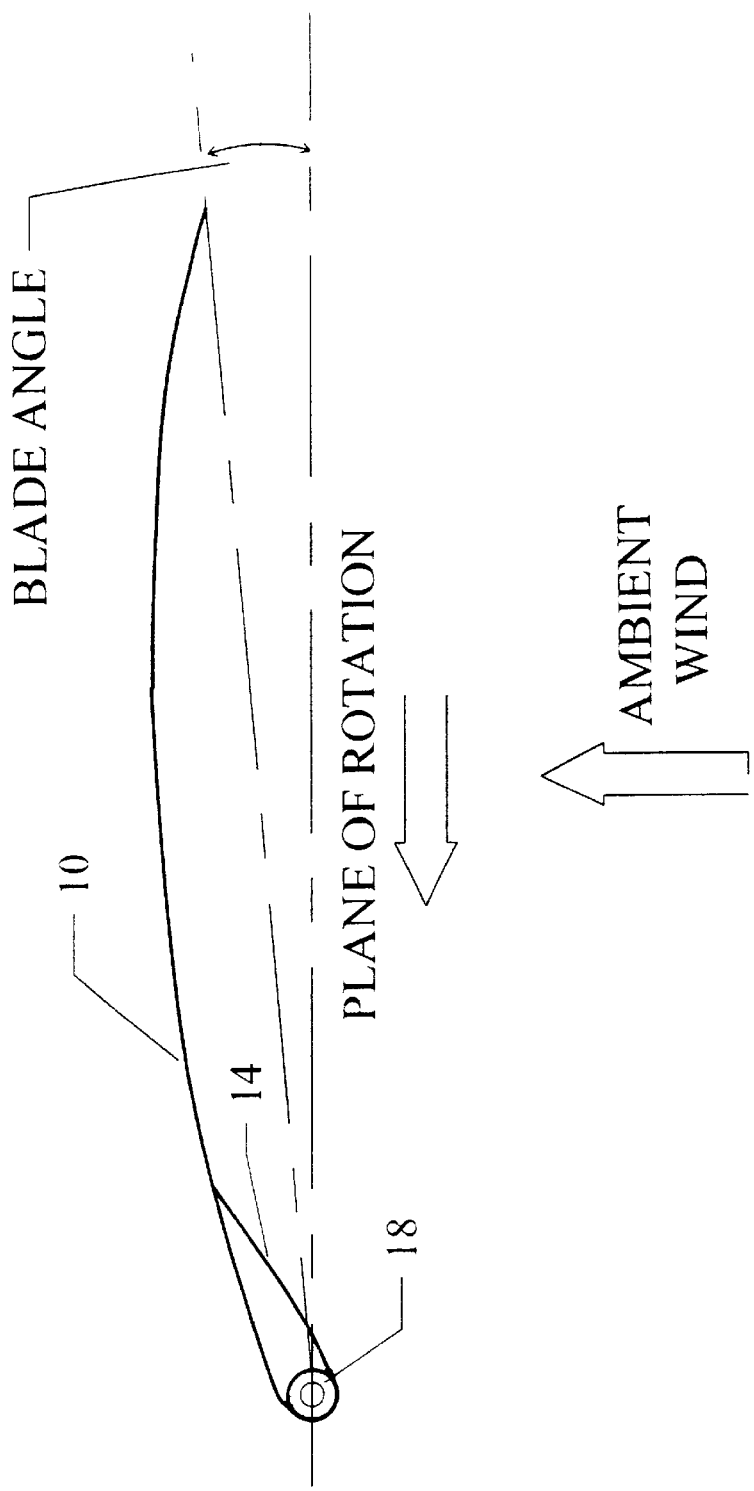
FIG. 3 is a diagram illustrating the aerodynamic surface and blade angle of a sail blade.

REFERENCE NUMERALS IN DRAWINGS 10 sail
14 sleeve in sail
18 spar
22 hub
24 sheeting cable
28 drawbar extension spring
32 compression spring
36 drawbar
40 D-ring
44 small connecting link
46 large connecting link
48 thimble
52 eyebolt

DETAILED DESCRIPTION OF THE INVENTION

Figure 4:
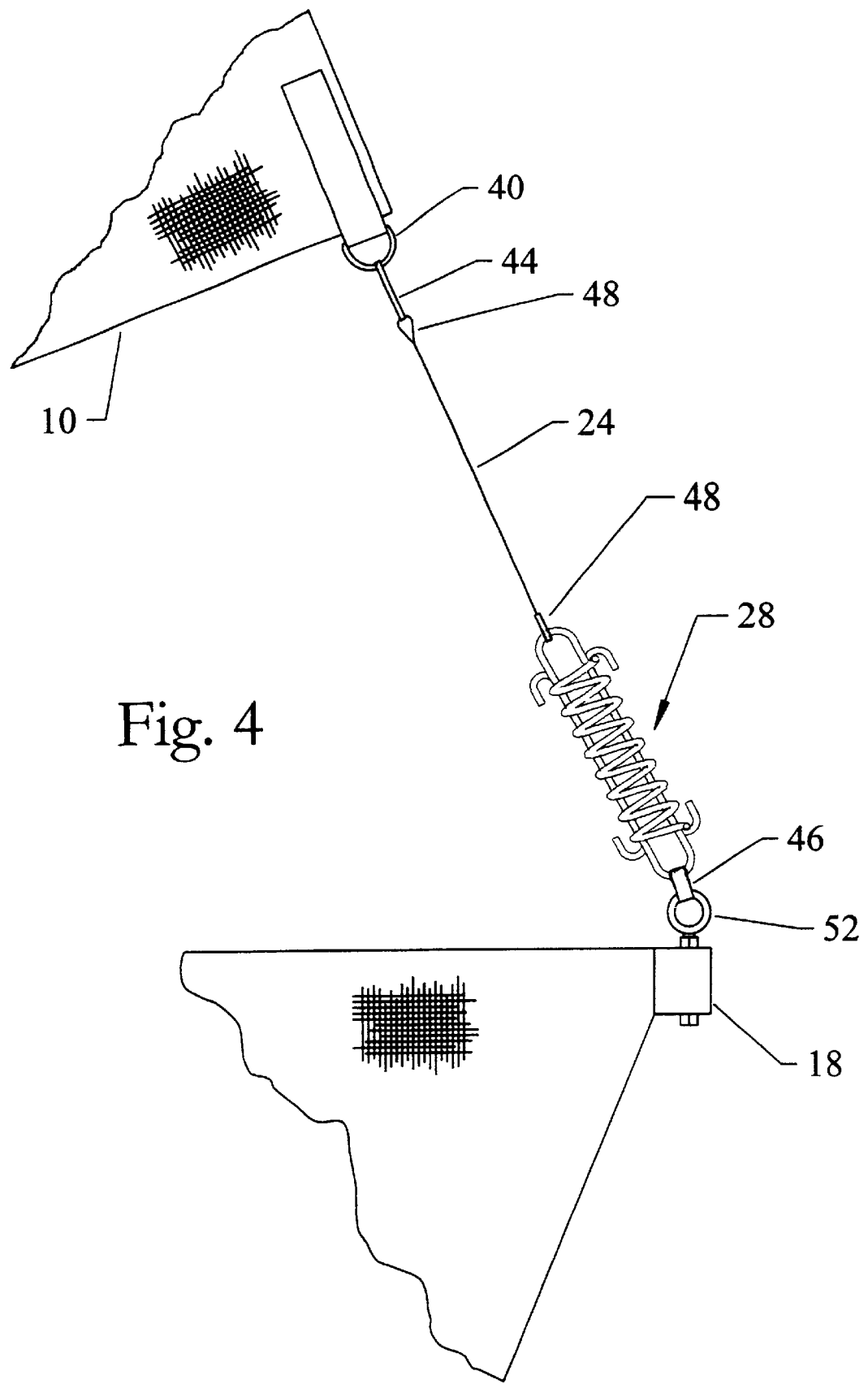
FIG. 4 is an enlarged view of the sheeting mechanism.

Referring to FIGS. 1–4, there is shown a sail 10 attached by a sleeve 14 to a radially extending spar 18 which is attached to a circular hub 22. The circular hub is operatively connected to a drive shaft, gears, and other means of transmitting mechanical energy as may be found in the prior art and which form no part of the present invention. The windmill is composed of eight such sails arranged in a symmetrical manner about the hub. A sheeting cable 24 attaches to the tip or clew of the sail. The cable securing the corner of a sail is referred to as a sheet in keeping with maritime practice. A drawbar type extension spring 28 is interposed between the sheet and the immediately following spar. A drawbar type extension spring is composed of a compression spring 32 with "U" shaped metal loops or drawbars 36 passing through the springs center and hooking around the opposite end of the spring; when tension load is applied to these drawbars they compress the spring, resulting in an extension of the assembly with the advantage that the drawbars provide a stop which prevents the spring from excessive deflection and failure. Referring to FIG. 4, various articles of connecting hardware are shown including a D-ring 40, small connecting link 44, thimbles 48, sheeting cable 24, large connecting link 46, and an eyebolt 52.

Operation

The drawbar extension springs are installed such that they apply a slight tension to the sails at all times. This initial tension helps keep the sails from destructive flapping when the wind changes direction suddenly. As the wind increases in velocity from a standstill, force generated on the sails pulls on the drawbars and compresses the springs; the drawbar assemblies then lengthen resulting in an increase in the blade angle of the sails. The blade angle of the sails is zero in no wind due to the initial tension of the drawbar spring. With increasing wind speed the blade angle increases. Compression springs 32 are provided whose spring constant maintains the sails at an angle of approximately 12 degrees or less throughout the range of useful working wind speeds. The spring constant of a compression spring characterizes the strength of the spring; the greater the spring constant, the more force is required to compress the spring a given distance.

In high winds the drawbar extension springs allow the angle of the blades to increase to a point where the area that the wind wheel presents to the wind is significantly reduced. The force of the wind upon the wheel is thereby limited to a value that the wind wheel and supporting structures can withstand. Also, as the blade angle of the sails increases beyond the optimum 12 degrees the sails become less and less efficient in capturing energy from the wind. The sails will eventually reach a point where they effectively stop producing enough lift to continue to accelerate the windmill wheel. The angular velocity of the wind wheel is therefore limited such that it will not fly apart due to increasing centrifugal force.

I recognized that a further improvement was necessary to minimize damage to the windmill wheel during hurricane force winds. A small connecting link 44, preferably of ultraviolet resistant polyester webbing, is provided between the sail's clew and sheeting cable 24. This link is constructed with a breaking strength less than that of the sail 10, sheeting cable 24, drawbar extension spring 28, large connecting link 46, and eyebolt 52. Thus, upon a hurricane force wind, small connecting link 44 shall break first, allowing the sail to fully extend normal to the plane of rotation of the wind wheel. The force of the wind upon the wind wheel is thereby eliminated, allowing for the survival of the wind wheel due to the sacrifice of an inexpensive connecting link.

From what has been described, it will be appreciated that I have invented a sail-type windmill wheel which has overcome the limitations of previous designs. The present invention renders the sail-type windmill practical for modern use by providing a wind wheel which is efficient in extracting energy from the wind, economic in use of materials, and capable of surviving severe storms.

Additional advantages and modifications will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What we claim is:

1. An improved sail-type windmill wheel comprising:
   a hub with a plurality of radially extending spars or arms thereon, and
   substantially triangular sails constructed of flexible material and secured along one edge to said spars, and
   the clew of said sails secured to drawbar extension springs, and said drawbar extension springs secured to the outer tips of the immediately adjacent spars, and said drawbar extension springs so constructed and arranged that an increase in the velocity of the wind will cause said drawbar extension springs to lengthen, resulting in an increase in the blade angle of said sails.

2. The windmill wheel of claim 1 further comprising a connecting means for connecting the clew of said sails and said drawbar extension springs, said connecting means having a breaking strength less than that of said sails, said drawbar extension springs, or any other linkage securing said sails, such that said connecting means shall break in the most severe winds thus allowing said sails to extend normal to the plane of wind wheel rotation, thereby eliminating the force of the wind upon said sails and wind wheel.

3. The windmill wheel of claim 1 wherein said sails are secured along the length of said spars by flexible sleeves formed along the leading edge of said sails, the sleeves thus formed enclosing said spars.

4. The windmill wheel of claim 1 wherein said sails are comprised of high modulus, firm finish, polyester fabric.

5. The windmill wheel of claim 1 wherein said drawbar extension springs are so constructed and arranged as to provide tension on said sails which maintains said sails at a blade angle of approximately 12 degrees or less during normal working wind speeds.

6. The windmill wheel of claim 1 wherein said drawbar extension springs are so constructed and arranged as to lengthen with increasing wind velocity until their maximum extension is reached, such maximum extension resulting in an increase in the blade angle of the sails which substantially limits the force of the wind upon said sails and windmill wheel.

* * * * *